(12) United States Patent
Beaujard et al.

(10) Patent No.: US 9,638,042 B2
(45) Date of Patent: May 2, 2017

(54) TURBINE ENGINE COMPRISING A METAL PROTECTION FOR A COMPOSITE PART

(75) Inventors: Antoine Jean-Philippe Beaujard, Vaux-le-Penil (FR); Didier Fabre, Avon (FR); Jean Pierre Mareix, Chartrettes (FR)

(73) Assignee: SNECMA, Paris (FR)

( * ) Notice: Subject to any disclaimer, the term of this patent is extended or adjusted under 35 U.S.C. 154(b) by 744 days.

(21) Appl. No.: 14/113,584

(22) PCT Filed: Apr. 27, 2012

(86) PCT No.: PCT/FR2012/050937
§ 371 (c)(1),
(2), (4) Date: Oct. 24, 2013

(87) PCT Pub. No.: WO2012/146875
PCT Pub. Date: Nov. 1, 2012

(65) Prior Publication Data
US 2014/0234118 A1    Aug. 21, 2014

(30) Foreign Application Priority Data

Apr. 28, 2011   (FR) .................................... 11 01321

(51) Int. Cl.
*F01D 5/14*   (2006.01)
*F01D 5/30*   (2006.01)
(Continued)

(52) U.S. Cl.
CPC ............. *F01D 5/147* (2013.01); *F01D 5/282* (2013.01); *F01D 5/3084* (2013.01);
(Continued)

(58) Field of Classification Search
CPC ........ F01D 5/30; F01D 5/3076; F01D 5/3084; F01D 5/3092
(Continued)

(56) References Cited

U.S. PATENT DOCUMENTS 3,132,841 A * 5/1964 Wilder, Jr. .............. F01D 5/282
                                                            416/219 R
3,713,752 A * 1/1973 Kurti ......................... F01D 5/30
                                                            416/219 R
(Continued)

FOREIGN PATENT DOCUMENTS

DE       37 10 321      6/1988
DE       42 37 031      2/1994
(Continued)

OTHER PUBLICATIONS

International Search Report Issued Jul. 4, 2012 in PCT/FR12/50937 Filed Apr. 27, 2012.

*Primary Examiner* — Sean J Younger
(74) *Attorney, Agent, or Firm* — Oblon, McClelland, Maier & Neustadt, L.L.P.

(57) ABSTRACT

A gas turbine engine including at least a first composite part configured for mounting in a second metal part of the engine, the first composite part including an interface surface configured to be in surface contact with the second metal part, the engine including a metal protection removably mounted on the first composite part and configured to cover the interface surface.

9 Claims, 1 Drawing Sheet

(51) Int. Cl.
*F01D 9/04* (2006.01)
*F01D 5/28* (2006.01)

(52) U.S. Cl.
CPC ........... *F01D 5/3092* (2013.01); *F01D 9/042* (2013.01); *Y02T 50/672* (2013.01)

(58) Field of Classification Search
USPC ...................................................... 415/209.3
See application file for complete search history.

(56) References Cited

U.S. PATENT DOCUMENTS

| | | | | |
|---|---|---|---|---|
| 4,207,029 | A * | 6/1980 | Ivanko | F01D 5/3092 416/220 R |
| 4,417,854 | A * | 11/1983 | Cain | F01D 5/284 416/219 R |
| 4,768,924 | A * | 9/1988 | Carrier | F01D 5/284 415/138 |
| 4,884,948 | A | 12/1989 | Sikorski | |
| 5,224,822 | A * | 7/1993 | Lenahan | C23C 30/00 415/177 |
| 5,343,694 | A * | 9/1994 | Toborg | F01D 9/042 415/209.2 |
| 5,372,476 | A * | 12/1994 | Hemmelgarn | F01D 9/042 415/135 |
| 5,380,152 | A | 1/1995 | Sikorski et al. | |
| 5,411,368 | A * | 5/1995 | Chase | F01D 9/044 228/132 |
| 5,494,404 | A * | 2/1996 | Furseth | F01D 9/042 415/209.3 |
| 5,630,700 | A * | 5/1997 | Olsen | F01D 5/189 415/134 |
| 6,164,903 | A * | 12/2000 | Kouris | F01D 9/04 415/135 |
| 6,290,466 | B1 | 9/2001 | Ravenhall et al. | |
| 6,464,456 | B2 * | 10/2002 | Darolia | F01D 9/042 415/134 |
| 6,579,061 | B1 * | 6/2003 | Heyward | F01D 5/143 29/889.22 |
| 6,619,917 | B2 * | 9/2003 | Glover | F01D 9/042 29/889.22 |
| 7,452,189 | B2 * | 11/2008 | Shi | F01D 5/147 415/200 |
| 7,600,967 | B2 * | 10/2009 | Pezzetti, Jr. | F01D 11/005 415/115 |
| 7,625,170 | B2 * | 12/2009 | Greene | F01D 5/147 415/110 |
| 7,762,766 | B2 * | 7/2010 | Shteyman | F01D 25/246 415/135 |
| 2002/0071766 | A1 | 6/2002 | Corbin et al. | |
| 2007/0122266 | A1 * | 5/2007 | Cairo | F01D 5/284 415/134 |
| 2010/0189562 | A1 | 7/2010 | Blanchard et al. | |
| 2010/0284816 | A1 * | 11/2010 | Propheter-Hinckley | F01D 5/3007 416/241 B |
| 2011/0008163 | A1 | 1/2011 | Prentice et al. | |
| 2011/0081237 | A1 * | 4/2011 | Durocher | F01D 9/06 415/173.1 |

FOREIGN PATENT DOCUMENTS

| | | |
|---|---|---|
| EP | 1 085 172 | 3/2001 |
| EP | 1 215 365 | 6/2002 |
| FR | 2 559 422 | 8/1985 |
| FR | 2 941 487 | 7/2010 |

* cited by examiner

TURBINE ENGINE COMPRISING A METAL PROTECTION FOR A COMPOSITE PART

BACKGROUND OF THE INVENTION

Field of the Invention

The invention relates to gas turbine engines in particular for use in the aeronautical field.

Description of the Related Art

A gas turbine engine intended to be fitted on an aircraft conventionally includes a plurality of parts which are connected to one another by fixings of different types such as flanges. In some configurations, two parts of the engine can be made to slide against one another along their contact surfaces due to thermal expansion. By way of example, a low-pressure distributor of a gas turbine engine includes a plurality of metal blades which are mounted in a fixed manner in the metal housing of the engine. To this end, each blade includes a lower platform and an upper platform which are shaped so as to be fixed respectively to a lower housing element and to an upper housing element of the engine. During the operation of the engine the platforms of the blade and the housing elements expand, which results in sliding between the platform and the housing element thereof in which it is fixed. The surface contact of two parts is currently designated "fretting" by the person skilled in the art. The more substantial the fretting is, the more the fatigue resistance of the parts is reduced.

In the engines according to the prior art, the fretting has no drawbacks given that the parts in contact are both metal and thus have comparable expansion factors.

In order to reduce the mass of an engine, it was proposed to replace the metal blades by blades made of composite material having fibres embedded in a matrix. When a platform of a blade made of composite material is in surface contact with a metal housing element, the matrix of the platform deteriorates and can cause oxidation of the fibres of the composite material. The service life and the performance of the blades made of composite material may then be impaired.

BRIEF SUMMARY OF THE INVENTION

In order to eliminate at least some of these drawbacks, the invention proposes to protect the contact surfaces of the platforms made of composite material by covering them with a metal protection. The origin of the invention lies in the fixing of a distributor blade made of composite material in a metal housing but it is applicable to the fixing of any part made of composite material which has a metal part and is subject to "fretting".

To this end, the invention relates to a gas turbine engine including at least a first composite part arranged for mounting in a second metal part of the engine, the first composite part including an interface surface intended to be in surface contact with the second metal part, the engine including a metal protection removably mounted on the first composite part and adapted to cover said interface surface.

The metal protection advantageously makes it possible to protect the matrix of the composite part, which improves the service life of the assembly. The second metal part is solely in surface contact with the metal protection, which limits the damage due to fretting.

The metal protection preferably has a shape complementary to the composite part so as to be able to form a metal skin on the composite part.

The first composite part preferably includes a means for radial locking of the metal protection. Thus the metal protection is integral with the composite part whilst being free to expand.

According to a preferred aspect of the invention, the radial locking means is presented in the form of an annular groove.

Preferably, the metal protection includes an annular lip adapted to co-operate with the annular groove. Thus the metal protection is locked radially with the composite part by co-operation of the annular groove with the annular lip.

According to an aspect of the invention, the metal protection includes an annular groove of which the cavity is turned towards the second metal part.

Preferably, the metal protection being formed by deformation of a flat metal sheet, the annular groove is formed facing the annular lip on the metal sheet. The metal protection advantageously originates from a flat metal sheet, which reduces the cost of manufacture of the protection. The deformation of the metal sheet in order to form the annular lip on a face of the sheet results in the formation of an annular groove on the opposite face of the metal sheet.

The metal sheet preferably has a constant thickness, which reduces the cost of manufacture of the protection.

Also preferably, the engine includes a sealing joint in the annular groove of the metal protection so as to provide sealing between the metal protection and the metal part. The sealing joint is preferably toric.

Preferably, the first composite part is a stator blade and the second metal part is a housing of the engine. The composite stator blade, covered with a metal protection, is advantageously fixed in the metal housing of the engine, which avoids any damage to the blade by fretting.

BRIEF DESCRIPTION OF THE SEVERAL VIEWS OF THE DRAWINGS

The invention will be better understood when reading the following description given solely by way of example and with reference to the appended drawings, in which:

With reference to FIG. 1, a gas turbine engine for aircraft extends axially along an axis X. The terms "upstream" and "downstream" are defined below in relation to direction of the gases in the engine, the axis X being oriented from the upstream to the downstream direction in FIG. 1. The low-pressure distributor of the engine includes a plurality of stator blades 1 which are mounted in the metal housing of the engine 2.

DETAILED DESCRIPTION OF THE INVENTION

Figure 1:
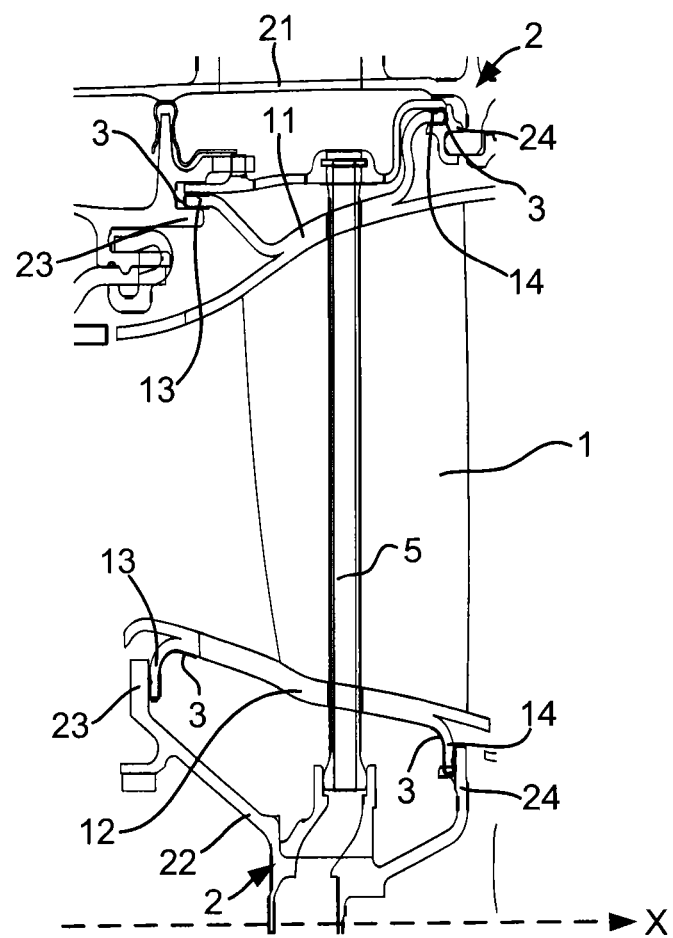
FIG. 1 shows a sectional view of a blade of a low-pressure distributor of a gas turbine engine according to the invention.

In this example the blade 1 consists of composite material formed from fibres embedded in a matrix. In this example, the composite material includes glass fibres embedded in a ceramic matrix (CMC). As shown in FIG. 1, the blade 1 includes an upper fixing platform 11 and a lower fixing platform 12 which are made of composite material. Each platform 11, 12 includes an upstream leg 13 and a downstream leg 14 which are fixed to the housing 2 of the engine. The housing 2 includes an upper housing element 21 and a lower housing element 22 to receive respectively the upper fixing platform 11 and the lower fixing platform 12. To hold the upstream and downstream legs 13, 14 of each platform 11, 12, each housing element 21, 22 includes an upstream flange 23 and a downstream flange 24 arranged to be in surface contact with the upstream and downstream legs 13, 14 respectively as shown in FIG. 1.

Each platform 11, 12 is preferably produced in a loose texture. A loose texture is characterised by a separation, in its thickness, of the layer of fibres forming the platform in order to form two distinct layers, known as loose texture legs, which diverge radially from one another whilst remaining connected by the ceramic matrix.

Figure 2:
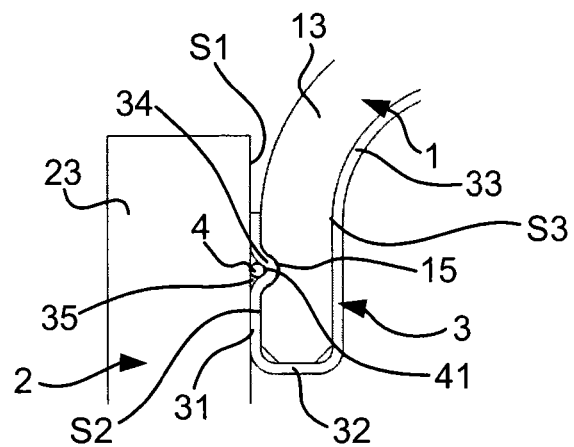
FIG. 2 shows a view close to the upstream contact zone between the lower platform of the blade and a lower housing element of the gas turbine engine of FIG. 1.

In order to prevent the legs 13, 14 made of ceramic material of the blade 1 from being damaged by surface contact with the flanges 23, 24 of the housing 2, the legs 13, 14 are covered by a metal protection 3 as shown in FIGS. 1 and 2.

With reference to FIG. 2 showing the upstream flange 23 of the lower housing element 22 in contact with the upstream leg 13 of the lower platform 12, the upstream metal flange 23 includes a radial annular surface S1 intended to come into contact with a radial annular surface S2 (or interface surface S2) of the upstream leg 13 made of composite material. In order to limit the stresses relating to the differential expansions and protect the upstream leg 13 made of composite material, the contact surface S2 of the upstream leg 13 is covered by a metal protection 3 known to the person skilled in the art under the name "foil". This metal protection 3 is removable from the upstream leg 13 to enable it to be replaced in case of wear.

The surface contact between the metal protection 3 and the metal flange 2 does not present any drawbacks. The two metal materials are not prone to deteriorate by friction against one another by "fretting" given that the coefficients of expansion thereof are comparable. Furthermore, only the contact zones are protected, which do not have an adverse effect on the mass of the blade 1.

The metal protection 3 is mounted integral with the composite leg 13 in order to form a skin at the level of its contact surface S2 with the metal flange 23. In other words, the metal flange 23 is no longer in contact with the composite leg 13 but with the metal protection 3, which eliminates any risk of wear and deterioration of the composite material of the upstream leg 13 by friction with the metal flange 23.

As shown in FIGS. 1 and 2, the upstream leg 13 of the lower platform 12 extends radially towards the axis of the engine. The metal protection 3 envelops the radial end of the upstream leg 13 in such a way as to cover the upstream surface S2, intended to be in contact with the metal upstream flange 23, and the downstream surface S3 thereof. In this example, the metal protection 3 is circumferential and has an axial U-shaped section, the upstream leg 13 being accommodated in the cavity of the U. In other words, the metal protection 3 includes an upstream branch 31, a bottom 32 and a downstream branch 33, the branches 31, 33 being resilient to enable the mounting of the protection 3. In this example, with reference to FIG. 2, the downstream branch 33 is longer than the upstream branch 31. The form of the metal protection 3 is advantageously defined to co-operate, by complementarily of forms, with the upstream leg 13 in order to form an integral connection which compensates for the thermal expansions.

The upstream leg 13 also includes a means for radial locking of the protection 3. In this example, the locking means is in the form of a circumferential annular groove 15 arranged in the upstream contact surface S2 of the upstream leg 13 as shown in FIG. 2. The annular groove 15 of the upstream leg 13 is arranged to receive a circumferential annular lip 34 which is formed in the upstream branch 31 of the metal protection 3 and which extends axially downstream to penetrate into the cavity of the annular groove 15. Thus the protection 3 is firmly positioned on the upstream surface S2 of the upstream leg 13.

Once the protection 3 is placed on the composite leg 13, the protection 3 cannot move radially relative to the composite leg 2 because of the co-operation of the lip 34 in the groove 15, rotation of the metal protection 3 relative to the composite leg 13 being nevertheless still possible. An annular groove 15 is very advantageous as a means of locking the protection, given that it allows thermal expansion of the protection 3 relative to the upstream leg 13. Of course other locking means could also be suitable.

Preferably, the metal protection 3 is made of a flat metal sheet which preferably has a constant thickness. The sheet is deformed to form a three-dimensional protection. Such a metal protection 3 advantageously has a low manufacturing cost.

As shown in FIG. 2, the protection 3 has on the upstream face of its upstream branch 31 an annular groove 35 of which the cavity is turned towards the upstream flange 23. In this example, the annular groove 35 is facing the lip 34. During the three-dimensional deformation of the sheet of constant thickness to form the protection 3, the formation of the annular lip 34 on a face of the sheet results in the formation of a groove 35 on the opposite face.

In other words, with reference to FIG. 2, the upstream surface of the protection 3 which is in contact with the upstream flange 23 is not flat but has an annular groove 35 of which the cavity extends axially downstream. Advantageously, a toric sealing joint 4 is fitted in the annular groove 35 of the composite leg 13. As shown in FIG. 2, the joint 4 is fitted between the upstream flange 23 and the protection 3 in order to ensure sealing between the upstream surface of the protection 3 and the downstream surface S1 of the upstream flange 23. This is particularly advantageous in order to form a sealed volume between the lower housing element 22 and the lower platform 12 of the blade 1, for example, when the blade 1 includes a ventilation tube 5 opening into the said volume (FIG. 1).

Previously an annular housing element 21, 22 was shown which may be in one piece or divided into sectors radially. For a housing element 21, 22 which is divided into sectors, the metal flanges 23, 24 are also divided into sectors. To improve the sealing of the contact between a flange divided into sectors 23, 24 and a metal protection 3, the protection 3 is preferably divided into sectors in such a way that the interfaces of the sectors of the protection 3 are offset relative to the interfaces of the sectors of the flange divided into sectors 24. In other words, a radial interface of a flange sector 23, 24 is not aligned axially with a radial interface of a sector of the protection 3 to prevent the circulation of an axial airflow. This is particularly advantageous in order to form a sealed volume between the lower housing element 22 and the lower platform 12 of the blade 1, for example, when the blade 1 includes a ventilation tube 5 opening into the said volume (FIG. 1).

The invention claimed is:
1. A gas turbine engine comprising:
   a first composite blade including a radially inner platform, the inner platform including an upstream leg and a downstream leg;
   a second metal housing of the engine in which the first composite blade is mounted, the second metal housing including an upstream flange and a downstream flange, the upstream flange being disposed further upstream than the upstream leg of the inner platform, and the downstream flange being disposed further downstream than the downstream leg of the inner platform; and a metal protection removably mounted on at least one of the upstream leg and the downstream leg of the inner platform of the first composite blade and configured to cover the at least one of the upstream leg and the downstream leg of the inner platform so as to present an interface surface between at least one of the upstream flange and the downstream flange and the metal protection, wherein the at least one of the upstream leg and the downstream leg of the inner platform of the first composite blade includes an annular groove for radial locking of the metal protection.

2. The engine according to claim 1, wherein the metal protection has a form complementary to the at least one of the upstream leg and the downstream leg of the inner platform of the first composite blade.

3. The engine according to claim 1, wherein the metal protection includes an annular lip configured to co-operate with the annular groove.

4. The engine according to claim 3, wherein the metal protection is formed by deformation of a flat metal sheet, and the annular groove is formed facing the annular lip on the metal sheet.

5. The engine according to claim 4, wherein the metal sheet has a constant thickness.

6. The engine according to claim 1, wherein the metal protection includes an annular lip including a cavity turned towards the second metal housing.

7. The engine according to claim 6, wherein the engine includes a sealing joint in the annular cavity of the metal protection.

8. The engine according to claim 1, wherein the first composite blade is a stator blade.

9. The engine according to claim 1, wherein each of the upstream leg and the downstream leg of the inner platform of the first composite blade includes the metal protection.

* * * * *